US011454529B2

(12) United States Patent
Dasgupta et al.

(10) Patent No.: US 11,454,529 B2
(45) Date of Patent: Sep. 27, 2022

(54) AUGMENTED FLOWMETER WITH A SYSTEM FOR SIMULATING FLUID PARAMETERS

(71) Applicant: ABB Schweiz AG, Baden (CH)

(72) Inventors: Subhashish Dasgupta, Bangalore (IN); Mini Tt, Bangalore (IN); Suhas Chakravarthy, Bangalore (IN); Deepaknath Tandur, Bangalore (IN)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 16/758,909

(22) PCT Filed: Oct. 3, 2018

(86) PCT No.: PCT/IB2018/057663
§ 371 (c)(1),
(2) Date: Apr. 24, 2020

(87) PCT Pub. No.: WO2019/086978
PCT Pub. Date: May 9, 2019

(65) Prior Publication Data
US 2021/0181005 A1 Jun. 17, 2021

(30) Foreign Application Priority Data
Oct. 31, 2017 (IN) .............................. 201741038678

(51) Int. Cl.
*G01F 15/02* (2006.01)
*G01F 25/10* (2022.01)
(Continued)

(52) U.S. Cl.
CPC ............ *G01F 15/022* (2013.01); *G01F 25/10* (2022.01); *G01F 1/34* (2013.01); *G01F 1/56* (2013.01);
(Continued)

(58) Field of Classification Search
CPC . G01F 15/022; G01F 1/56; G01F 1/34; G01F 1/58; G01F 1/64; G01F 1/704;
(Continued)

(56) References Cited

U.S. PATENT DOCUMENTS 4,987,914 A     1/1991  Adney et al.
6,076,392 A *   6/2000  Drzewiecki ........... G01F 1/3227
                                                73/23.3
(Continued)

FOREIGN PATENT DOCUMENTS

CN    201233259 Y  *  5/2009
CN    206540794 U  *  10/2017
(Continued)

OTHER PUBLICATIONS

OPC Foundation (Unified Architecture, Jul. 3, 2014, OPC Foundation, https://web.archive.org/web/20140703063709/https://opcfoundation.org/about/opc-technologies/opc-ua/) (Year: 2014).*
(Continued)

*Primary Examiner* — Daniel R Miller
*Assistant Examiner* — Christian T Bryant
(74) *Attorney, Agent, or Firm* — Leydig, Voit & Mayer, Ltd.

(57) ABSTRACT

The present invention relates to a flowmeter for monitoring physical parameters of fluid passing through the flowmeter. The flowmeter being installed in a plant and communicatively connected through a gateway device to a server having a virtual model. The flowmeter comprising: a processing unit for computing a first processed data of a physical parameter associated with the fluid measured by the flowmeter. The flowmeter receives a second processed data from the server having the virtual model, wherein the virtual model provides the second processed data by computing the second processed data based on the first processed data and
(Continued)

data from at least one sensor provisioned in the plant. The present invention also provides for a system for monitoring physical parameters of fluid passing through a pipe in a plant with the flowmeter.

13 Claims, 2 Drawing Sheets

(51) Int. Cl.

| | | |
|---|---|---|
| *G01F 3/00* | (2006.01) | |
| *G01F 9/00* | (2006.01) | |
| *G01F 1/64* | (2006.01) | |
| *G01F 13/00* | (2006.01) | |
| *G01F 1/58* | (2006.01) | |
| *G01F 1/704* | (2006.01) | |
| *G01F 25/00* | (2022.01) | |
| *G01F 1/56* | (2006.01) | |
| *G01F 1/34* | (2006.01) | |
| *G01F 15/00* | (2006.01) | |

(52) U.S. Cl.
CPC .............. *G01F 1/58* (2013.01); *G01F 1/64* (2013.01); *G01F 1/704* (2013.01); *G01F 3/00* (2013.01); *G01F 9/00* (2013.01); *G01F 13/00* (2013.01); *G01F 15/00* (2013.01); *G01F 15/02* (2013.01); *G01F 25/00* (2013.01)

(58) Field of Classification Search
CPC . G01F 3/00; G01F 13/00; G01F 15/00; G01F 25/00; G01F 9/00; G01F 15/02; G01F 25/10
See application file for complete search history.

(56) References Cited

U.S. PATENT DOCUMENTS

| | | | |
|---|---|---|---|
| 2002/0020228 A1 | 2/2002 | Ohniski et al. | |
| 2010/0094569 A1* | 4/2010 | Gysling | G01F 1/667 |
| | | | 702/45 |
| 2012/0022807 A1* | 1/2012 | Weng | G01N 11/06 |
| | | | 702/50 |
| 2014/0041459 A1* | 2/2014 | Reese | G01F 1/74 |
| | | | 73/861.22 |
| 2015/0059446 A1* | 3/2015 | Agar | G01N 11/08 |
| | | | 73/54.02 |
| 2015/0127275 A1 | 5/2015 | Hies et al. | |
| 2016/0076926 A1* | 3/2016 | McCann | G01F 1/712 |
| | | | 73/152.29 |
| 2016/0245681 A1* | 8/2016 | Maginnis | G01F 25/15 |
| 2016/0292325 A1 | 10/2016 | Alzein et al. | |
| 2017/0082469 A1 | 3/2017 | Sai et al. | |
| 2017/0205373 A1* | 7/2017 | Cage | G01F 1/8422 |

FOREIGN PATENT DOCUMENTS

| | | | | |
|---|---|---|---|---|
| DE | 102005046319 A1 * | 3/2007 | ............ | G01F 1/86 |
| EP | 3056873 A1 * | 8/2016 | ............ | G01F 1/60 |
| EP | 3800323 A1 * | 4/2021 | ............ | E21B 49/00 |
| JP | 2008309743 A * | 12/2008 | | |
| KR | 20150008444 A * | 1/2015 | ............ | G01F 1/662 |

OTHER PUBLICATIONS

Stewart et al. ("Fundamentals of Flow Computers", White Paper, Yokogawa, Oct. 2017) (Year: 2017).*
PCT International Search Report and Written Opinion for PCT/IB2018/057663, dated May 9, 2019, 10 pages.
Search Report for related IN 201741038678, dated Dec. 28, 2019, 6 pages.

* cited by examiner

AUGMENTED FLOWMETER WITH A SYSTEM FOR SIMULATING FLUID PARAMETERS

CROSS-REFERENCE TO RELATED APPLICATIONS

This application is a national stage entry under 35 U.S.C. § 371 of PCT International Stage Patent Application No. PCT/IB2018/057663, filed Oct. 3, 2018, which claims priority to Indian Patent Application No. 201741038678, filed Oct. 31, 2017. The entire disclosures of the foregoing applications are incorporated herein by reference.

FIELD OF THE INVENTION

The present invention relates generally to monitoring fluid parameters in process industry and more particularly to an augmented flowmeter with a system for simulating fluid parameter.

BACKGROUND OF THE INVENTION

Monitoring of flow characteristics through pipelines is important to many industries like oil and gas, material processing and power generation. In order to maintain process quality, optimize performance, enhance safety standards and minimize downtime due to unexpected failures it is required that the monitoring of flow characteristics in process industry be done in a reliable, accurate and comprehensive manner. Flowmeters and other sensors are conventionally used in process industry where fluid passes through pipelines for monitoring the flow of fluid and other flow characteristics of the fluid.

However several diagnostic challenges surface with regards to monitoring flow characteristics using flowmeters or sensors in process industries when a fluid is being processed. First of all, reliability of sensors installed for measuring key parameters especially in challenging environments is important and need to be monitored and verified. For example, clogging of a flow sensor due to deposition of sludge in a flow-field, could substantially affect measurement accuracy and in fact could yield false readings. Again, a thermocouple fitted to a heated surface, could get dislodged, due to deterioration of the fixing adhesive under temperature cycles.

Secondly, certain important parameters of the fluid like fluid viscosity and core fluid temperature are challenging to measure. Viscosity is popularly measured by sampling the liquid. However, this is not a continuous process. While measuring pipe surface temperatures is relatively easy, bulk or core fluid temperature measurement is a challenge. This is because, sensors may be damaged due to high temperatures. Also, sensors installed within the pipe could impose an obstruction to smooth flow of the fluid. In many applications, like food processing, sensor insertion could pose a hygiene issue.

Hence, there is a need for a flowmeter that can be augmented with a computing system for simulating fluid parameters to enhance the performance of flowmeter including verifying reliability of sensors installed in a processing pipeline/equipment.

SUMMARY

The above-mentioned shortcomings, disadvantages and problems are addressed herein which will be understood by reading and understanding the following specification.

In one aspect, the present invention provides a flowmeter for monitoring physical parameters of fluid passing through the flowmeter installed in a plant. The flowmeter is communicatively connected through a gateway device to a server having a virtual model. The flowmeter comprising: a processing unit for computing a first processed data of a physical parameter associated with the fluid measured by the flowmeter wherein the flowmeter receives a second processed data from the server having the virtual model. Wherein the virtual model provides the second processed data by computing the second processed data based on the first processed data and data from at least one sensor provisioned in the plant.

In an embodiment the flowmeter as mentioned herein above comprises a memory to store the first processed data, measured data and the second processed data.

In another embodiment the flowmeter is communicatively connected to at least one human machine interface.

In an embodiment of the flowmeter as mentioned herein above the virtual model is a Finite Element Multiphysics model.

In an embodiment of the flowmeter, the second processed data is one or more results of simulation and/or results of computation, and/or reports of simulations and/or reports of computations carried out at the server.

In an embodiment of the flowmeter, the second processed data is a calculated value of viscosity.

In an embodiment of the flowmeter, the second processed data is an estimate of temperature of the fluid flowing through the flowmeter.

In another aspect, the present invention provides for a system for monitoring physical parameters of fluid passing through a pipe in a plant. The plant is having a flowmeter which is communicatively connected through a gateway device to a server with a virtual flowmeter model comprised in the system. The flowmeter receives a first processed data based on measurement from a processing unit comprised in the flowmeter. The flowmeter also receives data from a sensor connected along with the flowmeter for measurement of a physical parameter associated with the fluid passing through the flowmeter; and wherein the server computes a second processed data based on the first processed data from the flowmeter and the data from the at least one sensor using the virtual model, and the server provides the second processed data to the plant for monitoring.

In an embodiment, the system mentioned above wherein the second processed data is provided in the plant to at least one of flowmeter, control room, mobile/hand-held device.

In an embodiment, the system wherein the first processed data and second processed data are communicated using data model and protocols based on OPC-UA.

BRIEF DESCRIPTION OF DRAWINGS

The appended drawings illustrate exemplary embodiments as disclosed herein, and are not to be considered limiting in scope. In the drawings.

DETAILED DESCRIPTION

Figure 1:
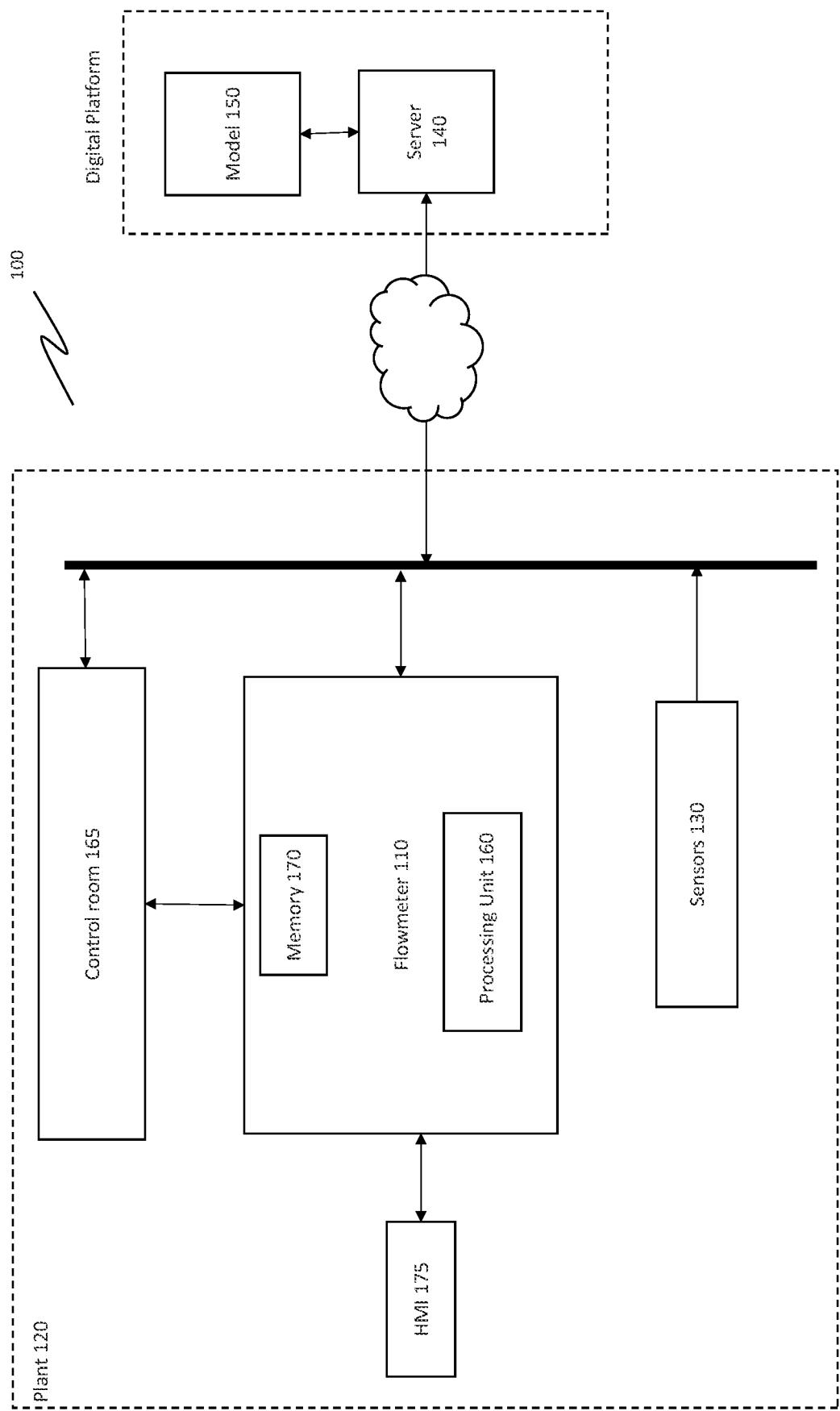
FIG. 1 shows a system for monitoring physical parameters of fluid passing through a flowmeter.

The present invention provides an augmented flowmeter with a system for simulating fluid parameters. The present invention is related to monitoring physical parameters of fluid passing through pipelines in industries like oil and gas, material processing, power generation etc. Reliable, accurate and comprehensive monitoring of flow characteristics through pipelines is important to such industries. This is in the interest of maintaining process quality, optimizing performance, enhancing safety standards and minimizing downtime due to unexpected failures.

The invention discloses a flowmeter that monitors physical parameters of fluid passing through the flowmeter installed in a plant and communicatively connected through at least one gateway device installed in the plant to a remote server. The remote server makes use of multiple models including finite element models for electro-magnetic field and fluid flow simulations using the physical parameters measured by the flowmeter and other measuring instruments & sensors installed in the plant that are monitoring one or more physical parameters relating to the fluid passing through the flowmeter. The server is capable of several computations as required to carry out a measurement related function (eg field/flow distribution reports, verification, soft-computed estimates of parameters relating to the fluid which is directly not being measured etc) relating to the flowmeter. The flowmeter installed in the plant is capable of receiving simulated/computed information/data from the server and use these data for further purposes such as display or communicate to the controller or other devices in the control system or to the control room in the plant. Such a system of a local flowmeter and a remote server system with a model is useful in several ways. Some exemplary use cases are illustrated below.

As mentioned above, there are several diagnostic challenges which surface as and when the fluid is being processed. Firstly, issues like sludge deposition in the flow field, clogging of flow sensors etc. can substantially affect reliability of correct representation of the field data. Also a thermocouple fitted to a heated surface, could get dislodged due to deterioration of the fixing adhesive under temperature cycles. Hence, there is a need for an augmented flowmeter and system to ensure reliability of sensors installed in a processing pipeline/equipment. Secondly, the present invention also provides for overcoming the challenge associated with measuring certain parameters like fluid viscosity and core fluid temperature.

In this invention, it is proposed to use a finite element model like CFD (computational fluid dynamics) model, to monitor and diagnose/study process related to the fluid flowing through the flowmeter. As a first step the model of fluid through a pipeline is created and customized to one or more condition in the plant with parameters measured with the flowmeter. The model is validated using laboratory experiments or from the measurement (one time or periodic) made at the site. The validated model, is flexible to mimic any subsystem in a process industry (for e.g. pipes and/or equipment such as measuring device, sensors, transducers, values along the pipe). The first challenge describe above, i.e. sensor reliability will be addressed by comparing overall trends between the model and the actual measurements. The second challenge, (estimation of parameters, not possible to be measured due to inaccessibility) will be resolved, by operating the model using iterative algorithms, using a few measurements. In other words, the model will be nested in an iterative algorithm, for determination of diagnostic parameters. The parameters are not limited to viscosity and pressure, but could be any parameters that are important for diagnosis.

The model will be versatile to adapt any changes in the system design (e.g. incorporation of a feature, shape/size changes) as well as process parameters (e.g. changes in flowrates, inlet temperature). Additionally, the model will have capability to predict change of parameters with time, in order to enable corrective action to be taken, at the cost of minimum downtime. This model is made available in a remote server and used for simulation in the server for a condition in the plant.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized. The following detailed description is, therefore, not to be taken in a limiting sense.

FIG. 1 shows a system 100 for monitoring physical parameters of fluid passing through a flowmeter 110. FIG. 1 shows the system being installed in a plant 120 that can be part of an industry employing pipelines for example oil and gas, material processing, power generation, food processing etc. Sensors 130 are in the installed plant 120. The sensors 130, flowmeter 110 and other devices (for example other field devices, smart I/Os and controllers in a control system) installed in the plant are communicatively connected through a gateway device to a remote server 140. The remote server 140 may be a cloud based system server farm/data centre or a digital platform hosted remotely. The flowmeter 110 also comprises a memory 170 for storing information from measurement, processed information or any data received from the server.

It may be known to a person skilled in the art that the gateway device and the flowmeter and sensors can communicate via protocols conventionally used for field device communication (HART, profibus, etc) and Object Linking and Embedding for Process Control-Unified Architecture (OPC-UA) protocol. Gateway device may also be communicatively connectable at other communication layers (example, control network layer connecting controllers of control system, and enterprise layer connecting operator/engineering stations) in addition to field device level connection. In the case, where the gateway is connected in a layer other than the field device layer the flowmeter and sensor data is communicated (sent and received) through a controller/server deployed in the control system.

The server 140 executes simulations using a virtual model 150. The server 140 receives flowmeter data (first processed data) based on measurements carried out by the flowmeter. The flowmeter data can be obtained as a direct measurement data made by the flowmeter or/and can also be after some processing (eg parameterization, noise reduction, simple statistical analysis such as average etc) using a processing unit 160 comprised in the flowmeter 110. The server 140 also receives data from one or more sensors 130 installed in the plant 120 in proximity to flowmeter 110, also engaged in measuring fluid related parameters of the fluid flowing through the flowmeter 110. The server 140 uses the model 150 to carry out various simulations and computations, some of these are illustrated later with exemplary use cases. For the purpose of simulation and computation, the model is provided with data from flowmeter 110 (first processed data) and/or data from the sensors 130 installed in the plant. One or more results and/or reports (second processed data) of the simulations and computations carried out at the server is communicated to the flowmeter. The one or more results can also be communicated to the control room 165 or any other device in the plant (for example HMI 175 which can be a handheld/mobile device).

Figure 2:
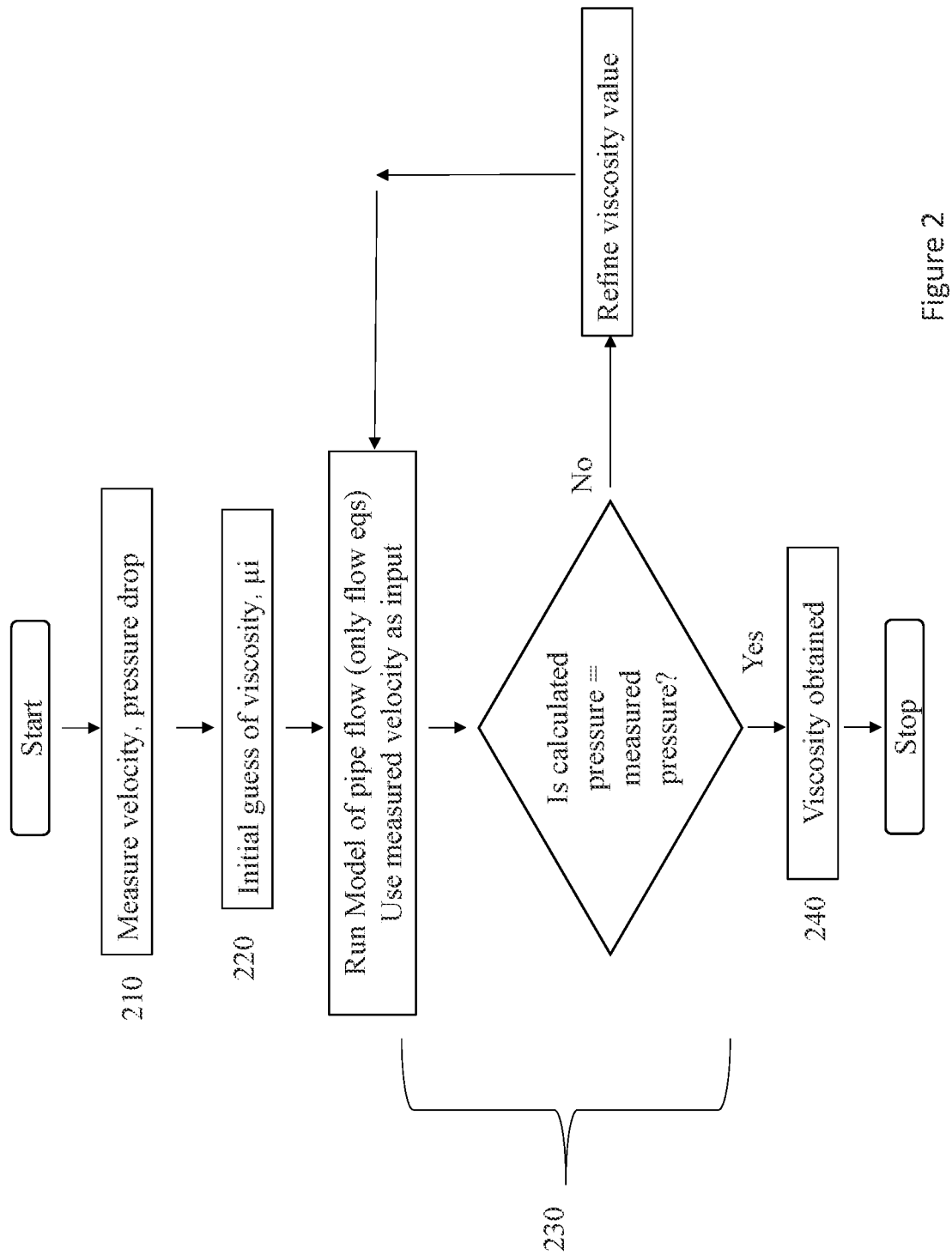
FIG. 2 shows a flow chart for viscosity calculation using a model in a remote server.

The working of the invention is illustrated with some exemplary use cases:

1. Non-invasive viscosity measurement: FIG. 2 provides a flow chart for viscosity calculation using a model (Computational Fluid Dynamics (CFD) model) in a remote server. The model is used for simulation and computation. The simulation is carried out using a nested iterative algorithm for calculation of viscosity (second processed data). Pressure drop and velocity data (first processed data) are measured/processed in the flowmeter installed in the plant (step 210). The simulation using the model is carried out using an initial value of fluid viscosity (guess value) (step 220). Pressure calculated by the model is compared against measured/processed data (pressure drop and velocity) i.e. first processed data. In case of any mismatch, the guessed value of viscosity is refined and model is re-run. Again, the simulated data (pressure drop/velocity) obtained from the CFD model is compared with the measured/processed value obtained with the flowmeter in the plant. This way the loop continues till the error reduces to zero or minimizes to an acceptable level (step 230). The value of viscosity when the error reduces to zero or minimizes to an acceptable level is the estimate of the fluid viscosity or viscosity of the fluid flowing through the flowmeter in the plant. The model can be executed at regular time intervals and change of viscosity with time can be monitored/reported in the server or communicated to the flowmeter or control room in the plant.

2. Non-invasive temperature measurement: This use case shows an iterative temperature measurement algorithm which incorporates the CFD model used in a remote server. The fluid velocity (first processed data) is measured with a flowmeter in the plant and also a pipe surface temperature (sensor data) is measured with a sensor in the plant and made available to the model in the server. Similar to the above use case scenario for viscosity measurement, the fluid inlet temperature (second processed data) can be estimated using the CFD model with simulations performed starting with a guess value. Also, the CFD model can be made use for automatically calculation of the fluid core temperature in the pipe or any other temperature distribution across cross section of the pipe or along the pipe geometry (pipe and site infrastructure CAD model are used as an input for simulation by the CFD model), which can be used for diagnosis as required for any industrial use. The second processed data (temperature estimates) can be provided to one or more devices in the plant (eg flowmeter).

3. Checking reliability/verification of existing sensors: As illustrated in the earlier use cases for viscosity and temperature estimation using the virtual model and measured/processed data (first processed data) from the plant, any parameter associated with the fluid and supported with the model (i.e simulation using the model can be carried out with the measured/process data provided as input to the model to estimate the parameter of interest) can be determined through the system described in the invention. Such estimation (second processed data) through simulation can also be used to verify performance of the sensor or reliability of the sensors used in the plant by comparing the measured/processed data from the flowmeter/sensors used in the plant with the simulated data obtained using the model to verify and cross check reliable working of the flowmeter/sensors used in the plant. The simulation can also be performed for complex pipe structures, e.g. bend pipes and processed/simulated estimates of parameters of interest (second processed data) can be obtained. The second processed data is communicated to one or more devices in the plant (eg flowmeter).

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for monitoring physical parameters of fluid passing through a pipe in a plant, the system comprising:
   a flowmeter configured to measure a first physical parameter of the fluid passing through the pipe, the flowmeter comprising at least one processing unit configured to compute a first processed data based on the first physical parameter measured by the flowmeter;
   a gateway device in communication with the flowmeter;
   a sensor configured to measure a second parameter associated with the fluid flow through the pipe proximate the flowmeter and generate sensor data corresponding to the second parameter; and
   a server in communication with the gateway device and configured to receive the first processed data and the sensor data, the server is configured to compute, using a virtual flowmeter model, a second processed data based on the first processed data from the flowmeter and the sensor data from the sensor, wherein the second data is one of a calculated or an estimated value of a third physical parameter that is different from the first physical parameter and the second parameter, wherein the server is configured to provide the second processed data to at least the flowmeter, and
   wherein the server is configured to compute the second processed data by:
      determining an estimated third physical parameter;
      based on inputting the estimated third physical parameter into the virtual flowmeter model, determining an estimated second parameter;
      comparing the estimated second parameter and the second parameter from the sensor data to determine a difference between the estimated second parameter and the second parameter; and
      based on the difference between the estimated second parameter and the second parameter being less than a threshold, setting the third physical parameter for the second data as the estimated third physical parameter.

2. The system of claim 1, wherein the flowmeter further comprises a memory to store at least one of first processed data, measured data and the received second processed data.

3. The system of claim 1, wherein the flowmeter is communicatively connected to at least one human machine interface.

4. The system of claim 1, wherein the virtual model is a Finite Element Multiphysics model.

5. The system of claim 1, wherein the second processed data is one or more results of simulation and/or results of computation, and/or reports of simulations and/or reports of computations carried out at the server.

6. The system of claim 1, wherein the second processed data is a calculated value of viscosity.

7. The system of claim 1, wherein the second processed data is an estimate of temperature of the fluid flowing through the flowmeter.

8. The system of claim 1 wherein the second processed data is further provided to one or both of a control room, or a mobile/hand-held device.

9. The system of claim 1, wherein the first processed data and second processed data are communicated using data model and protocols based on OPC-UA.

10. The system of claim 1, wherein the server is further configured to compute the second processed data by:
based on the difference between the estimated second parameter and the second parameter being greater than the threshold:
determine one or more new third physical parameters;
re-execute the virtual flowmeter model one or more times based on the one or more new third physical parameters to determine one or more new estimated second parameters; and
based on comparing the one or more new estimated second parameters with the second parameter from the second sensor data, set the third physical parameter for the second data as a new third physical parameter of the one or more new third physical parameters.

11. The system of claim 1, wherein determining the estimated second parameter is based on inputting the initial third physical parameter and the first physical parameter into the virtual flowmeter model.

12. The system of claim 1, wherein the first physical parameter is a velocity measurement, wherein the second parameter is a pressure measurement, and wherein the third physical parameter is viscosity calculation.

13. The system of claim 1, wherein the first physical parameter is a velocity measurement, wherein the second parameter is a pipe surface temperature measurement, and wherein the third physical parameter is fluid inlet temperature calculation.

* * * * *